Nov. 29, 1955 G. W. MILLER 2,725,115
DEVICES FOR SEPARATING DUST FROM DUST-LADEN AIR
Original Filed July 9, 1953 3 Sheets-Sheet 3

INVENTOR.
GEORGE W. MILLER
BY
Murray G. Gleeson
ATTORNEY

United States Patent Office 2,725,115
Patented Nov. 29, 1955

2,725,115

DEVICES FOR SEPARATING DUST FROM DUST-LADEN AIR

George W. Miller, Chicago, Ill., assignor to Goodman Manufacturing Company, Chicago, Ill., a corporation of Illinois Continuation of abandoned application Serial No. 367,013, July 9, 1953. This application December 10, 1953, Serial No. 397,350

4 Claims. (Cl. 183—43)

This invention relates generally to devices for removing dust from dust-laden air resulting from the use of eductor type rock drilling mechanisms, and more particularly to an improved dust separating device of the cyclone type.

This application is a continuation of application Ser. No. 367,013 filed July 9, 1953, for Devices for Separating Dust From Dust-Laden Air, now abandoned.

One of the principal objects of the invention is to provide a simple, efficient device for removing dust from dust-laden air, which device may be readily transported on a low vehicle such as is found in a mine underground.

Another object is to provide a unitary structure which will perform a first step of cyclone separation of dust, and filtering in a subsequent step, and which will enable the separated dust to be removed readily by means of a receptacle made a part of the unitary structure.

Other objects and important features of the invention will be apparent from a study of the following specification taken with the drawings which together show and describe a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown nor otherwise than by the terms of the subjoined claims.

Figure 1:
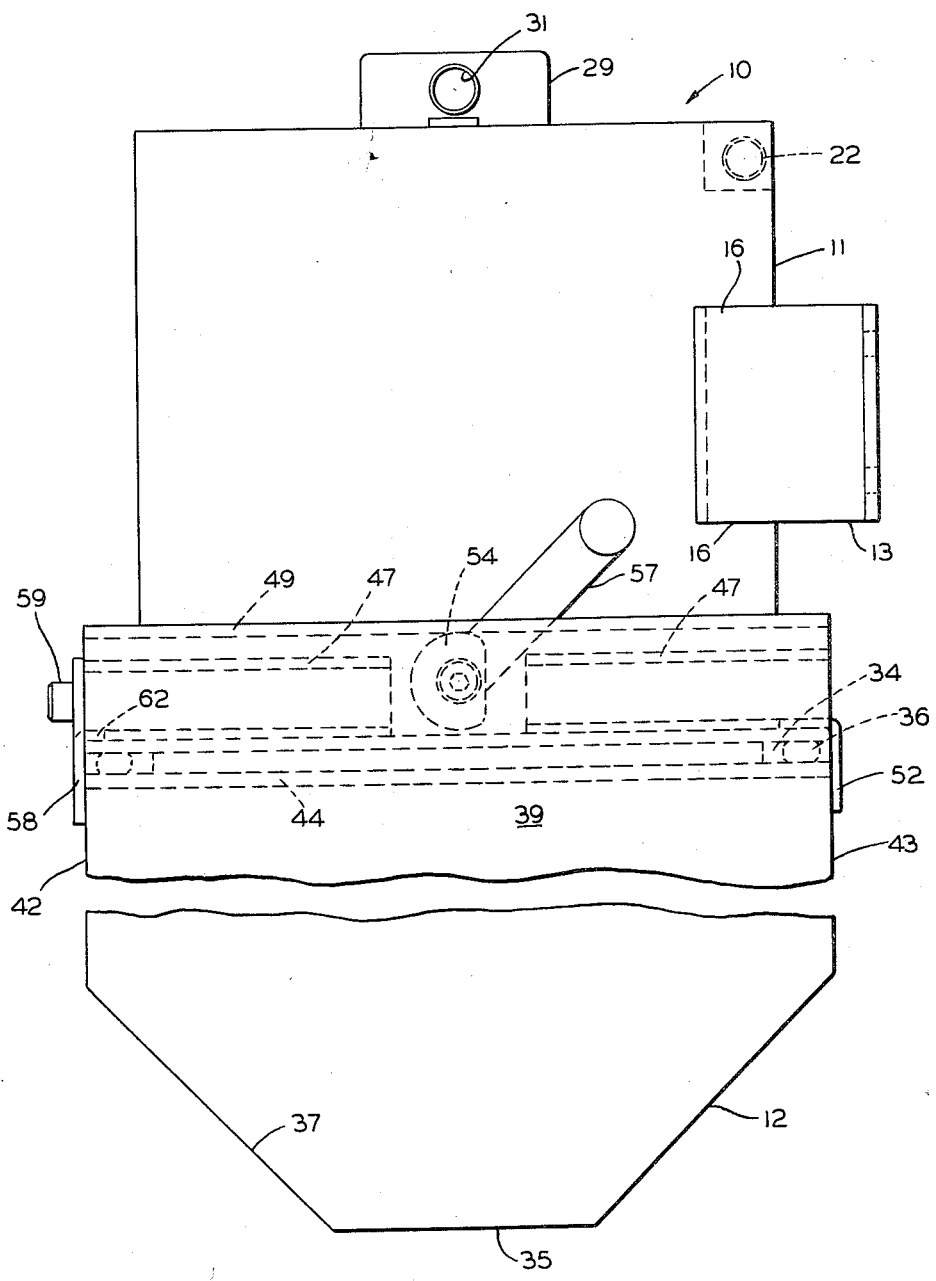
Fig. 1 is a side view of a dust separating device according to the present invention.

Referring now to the drawings, the improved device according to the present invention is referred to generally by the reference numeral 10, and consists of an upper dust separating portion 11 and a lower dust receiving receptacle 12. The entire unit 10 may be supported from the side of a mine vehicle, not shown, by means of a mounting bracket 13 having a contour 14 corresponding to the cylindrical contour of the upper dust separating portion 11 and welded thereto along weldments 16.

Figure 2:
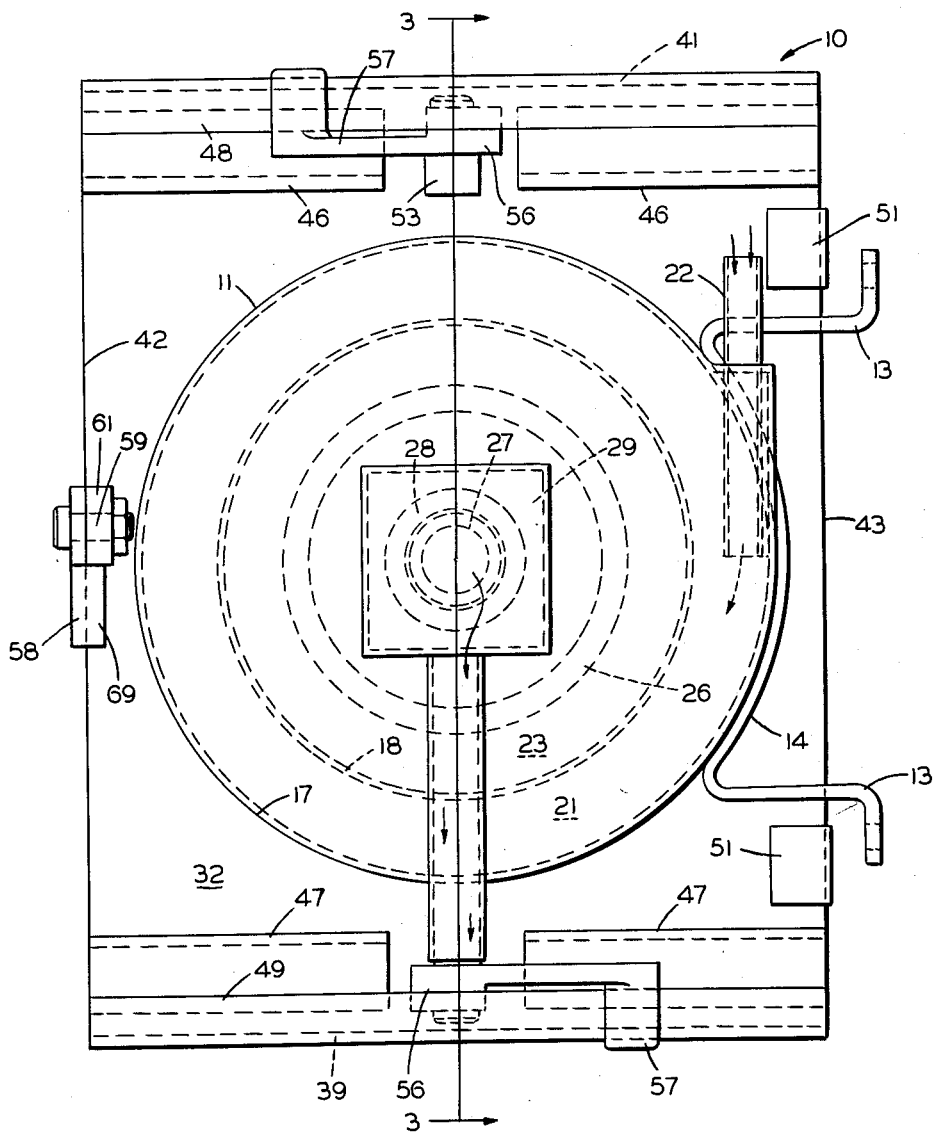
Fig. 2 is a top view thereof, certain hidden parts being shown in dotted outline.
Figure 3:
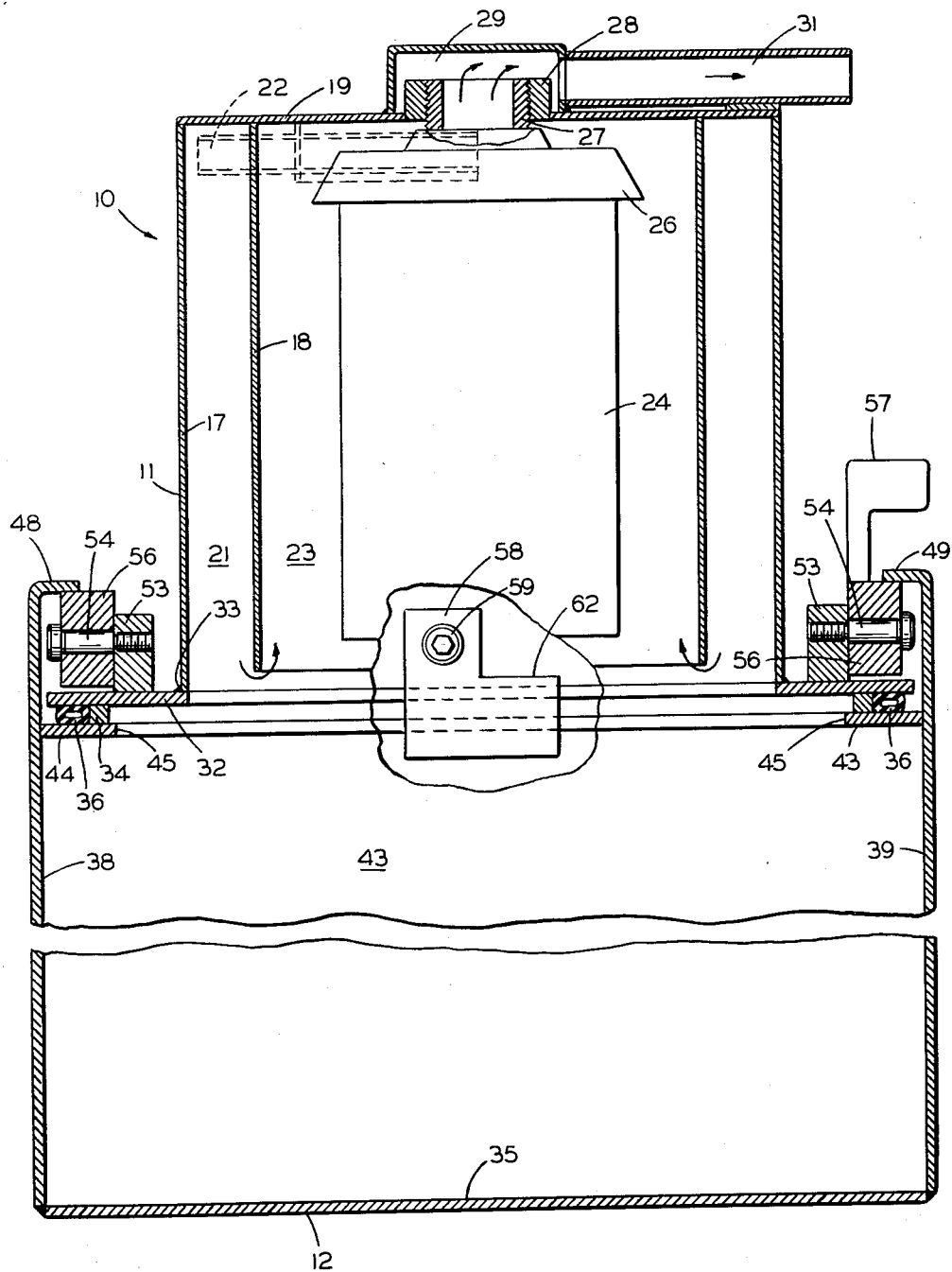
Fig. 3 is a vertical sectional view taken along the line 3—3 in Fig. 2, looking in the direction of the arrows, certain parts being shown in elevation.

As seen more particularly in Fig. 3, the dust separating portion 11 consists of a pair of cylinders 17 and 18 of different diameters having a common axis. The cylinders 17 and 18 have a common top closure plate 19 welded to the upper edges of the cylinders 17 and 18. The two cylinders 17 and 18 thus define an annular chamber 21 having an entrance pipe 22 thereto, said entrance pipe 22 being mounted substantially tangentially to the outer annular chamber 21 near the top thereof as seen in Figs. 1 and 2, so that the entrant dust-laden air will enter the chamber 21 with constantly changing acceleration so as to separate the dust from the air to cause same to fall into the receptacle 12.

The inner cylinder 18 defines a chamber 23 in which is mounted a filter element referred to generally by the reference numeral 24. Said filter element has a dust deflector flange 26 and a central mounting nipple 27 which is threaded into a mounting nut 28 disposed on the top of the top closure 19. The precise form of such a filter element forms no part of the present invention and many different commercial forms are available. In the embodiment of the invention herein, however, it is preferred that such a filter element be composed of a central supporting structure having radially extending felt material in a plurality of double thickness radially extending folds so as to present the greatest possible surface area to the air entering the chamber 23.

The dust-laden air entering the chamber 21 thus takes a generally helical path therethrough, the dust carried thereby being deposited into the receptacle 12. The air which has been freed in part from its dust content then travels upward into the central chamber 23, as shown by the arrows in Fig. 3, to impinge against the surface of the filter element 24. The air which has been separated from the remainder of its dust content by the filter element 24 enters an outlet passageway 29 which is made continuous with an outlet pipe 31. In certain forms of mechanism to which the device of the present invention is peculiarly adapted, the outlet pipe 31 may be connected to a vacuum pump or the like, the entrance passageway 22 being connected to the eductor hose of a rock drill having eductor means associated therewith to minimize the presence of rock dust at the drilling face. Such an eductor device and drill bit particularly suitable therefor is shown in an application of James M. Powell filed June 3, 1953, bearing the Serial No. 359,249, for Rock Drill Bit.

In the course of operation the receptacle 12 will be filled readily with dust separated from the air entering the dust separating portion 11. To this end the receptacle 12 is made readily detachable from the dust separating portion 11, so that it may be filled and emptied as many times as desired during a working shift. The lower end of the outer cylinder 17 accordingly has affixed thereto a flange-like support plate 32 which may be held thereto by means of weldments 33. As seen in Fig. 2, the flange-like support plate 32 is rectangular in shape and has welded to the bottom thereof a substantially rectangular rib 34 spaced inward from the edges of the support plate 32. A flexible O-ring seal 36 is stretched about the rectangular rib 34 for a purpose as will presently appear.

The receptacle 12 has a bottom 35 with sloping sides 37, vertical sidewalls 38, 39 and vertical end walls 42 and 43. A rectangular flange 44 having a central opening 45 extends inwardly from the sidewalls 39 and 41 and the opposite end walls 42 and 43 to bear against the rib 34 and the O-ring seal 36 as seen in Fig. 2.

The support plate 32 has welded thereto channel-shaped rail members 46, 46 at one end thereof. The opposite end of the support plate 32 likewise has welded thereto a pair of channel-shaped rail members 47, 47. The rail members 46, 46 cooperate with a flange 48 extending inwardly from the top of the wall 38 of the receptacle 12, and the rail members 47, 47 likewise cooperate with a flange 49 extending inwardly from the top of the opposite end wall 39 of the hopper 12. The receptacle 12 may thus be slid into position beneath the support plate 32 the receptacle riding by means of its inturned flanges 48 and 49 along the channel guide rails 46, 46 and 47, 47 respectively.

The limit of movement of the receptacle 12 is determined by means of stops 51, 51 welded to the support plate 32 and having extensions 52 downward therefrom as seen more clearly in Fig. 1.

As seen in Fig. 2, the rails 46, 46 and the opposite rails 47, 47 are discontinuous adjacent the center line of the plate 32. Means are disposed at these discontinuous points for lifting the receptacle from contact with the rails 46 and 47 and for locking the receptacle in place against the rib 34 at the same time compressing O-ring 36.

Such means include a support block 53 mounted on top of the support plate 32 at each side thereof between the discontinuous portions of the guide rails 46, 46 and between the discontinuous portions of the guide rails 47, 47. A stub shaft 54 is threaded into each support block 53 and an eccentric 56 is mounted thereon, said eccentric having an operating lever 57. The operating levers 57, 57 are rocked in opposite directions so as to lift the flanges 48 and 49 respectively and to compress the sealing ring 36 with the inturned flange 43 bearing against the rib 34.

When the receptacle is thus locked in the manner described to the other side of the support plate 32 it may be held further in position against shifting by means of a locking lug 58 mounted on the end of the support plate 32 opposite to the stops 51 at the other end thereof. The locking lug 58 is connected by means of a bolt 59 to a support 61 welded to the upper side of the support plate 32. The locking lug 58 has a bent over portion 62 which bears against the upper surface of the plate 32 to hold same in position against undesired rocking.

It should be noted that the relationship of the flange 44, the rib 34 and the seal 36 may be such that the eccentrics 56 and locking levers 57 do not perform the entire sealing operation, but serve merely to position such parts properly, so that the final sealing operation may be achieved by the pressure of the outside air against the seal 36 in turn bearing against the rib 34. Such outside pressure will be effective to distort the seal 36 until it is in sealing contact with the underside of the support plate 32, the outer surface of the rib 34 and against the upper side of the flange 44.

By such a construction it is not necessary to hold the tolerances quite so closely, and it enables the eccentrics 56 and the locking levers 57 to be used for proper positioning of the receptacle 13.

It will be seen from the foregoing description that when the receptacle 12 is locked in position in the manner described, the only means of passage of air through the dust separating device 10 is by means of the entrance passage 22 the respective compartments 21, 23 and the exit passage 31. The dust separating from the entrant air in the annular chamber 21 thus falls into the receptacle 12, and when the receptacle is full it may be readily detached from the air separating portion 11 by a reverse set of sequences than those described.

While the invention has been described in terms of a preferred embodiment thereof it is intended that the scope of the invention be limited only by the terms of the claims here appended.

I claim as my invention:

1. A dust separating device for use with a rock drill of the eductor type or the like comprising a pair of substantially annular chambers defined by cylinders of different diameters having a common axis, a top closure plate common to both of said cylinders, an entrance pipe for dust-laden air connected to said outer annular chamber, said entrance pipe being mounted substantially tangentially to said outer annular chamber so as to impart changing acceleration to the dust-laden air entering said chamber to cause the dust to be separated from such air, a filter element mounted in the central chamber and detachably secured to said top closure plate, an exit passageway having an opening onto the interior of said filter element and extending from said top closure plate, a flange-like support plate extending from said outer cylinder, a detachable receptacle for receiving dust which has been separated from said dust-laden air by said outer annular chamber and said filter element, a sealing member interposed between said receptacle and said support plate, a guide rail disposed on a pair of opposite sides of said support plate, an upper inturned flange on said receptacle, a lower inturned flange on said receptacle, said upper inturned flange sliding upon said guide rail for movement of said receptacle into place, and means for lifting said receptacle from said guide rails and against said support plate with said sealing member interposed between said support plate and said lower inturned flange, said means comprising an eccentric disposed on the outer side of said outer annular chamber, and means for rocking said eccentric.

2. The invention as defined in claim 1 wherein said support plate has a rib depending therefrom, and wherein the lower inturned flange of said receptacle bears against said rib, said sealing member bearing against said support plate, said rib and the lower inturned flange of said receptacle.

3. A dust separating device for use with a rock drill of the eductor type or the like comprising a pair of substantially annular chambers defined by cylinders of different diameters having a common axis, a top closure plate common to both of said cylinders, an entrance pipe for dust-laden air connected to said outer annular chamber, said entrance pipe being mounted substantially tangentially to said outer annular chamber so as to impart changing acceleration to the dust-laden air entering said chamber to cause the dust to be separated from such air, a filter element mounted in the central chamber and detachably secured to said top closure plate, an exit passageway having an opening onto the interior of said filter element and extending from said top closure plate, a flange-like support plate extending from said outer cylinder, a detachable receptacle for receiving dust which has been separated from said dust-laden air by said outer annular chamber and said filter element, a guide rail disposed on a pair of opposite sides of said support plate, a sealing member disposed on the under side of said support plate, an upper inturned flange on said receptacle, a lower inturned flange on said receptacle, said upper inturned flange sliding upon said guide rail for movement of said receptacle into place, and means for lifting said receptacle from said guide rails to a position whereby said lower inturned flange bears tightly against the seal disposed on the underside of said support plate.

4. The combination of a device for separating dust from dust-laden air with a lower receptacle for receiving such dust which comprises a mounting flange for said receptacle disposed on said device, a pair of inturned upper flanges on said receptacle arranged to guide said receptacle on to said flange for support thereby, a sealing flange on said receptacle, a sealing member supported on said first flange on the lower side thereof, a rib formed on said first flange and providing a means for locating said sealing member, and means for locking said receptacle to said first flange with said sealing member therebetween, said means comprising an eccentric mounted on said first named flange and rotatable to engage the inturned upper flange and lift said receptacle with the sealing flange thereof in tight contact with said sealing member.

References Cited in the file of this patent
UNITED STATES PATENTS

| | | |
|---|---|---|
| 1,110,344 | Preston | Sept. 15, 1914 |
| 1,471,807 | Roosevelt et al. | Oct. 23, 1923 |
| 2,622,696 | Pegg et al. | Dec. 23, 1952 |